July 31, 1951 T. J. DENNING 2,562,486
CULTIVATOR
Filed Dec. 31, 1948 3 Sheets-Sheet 1
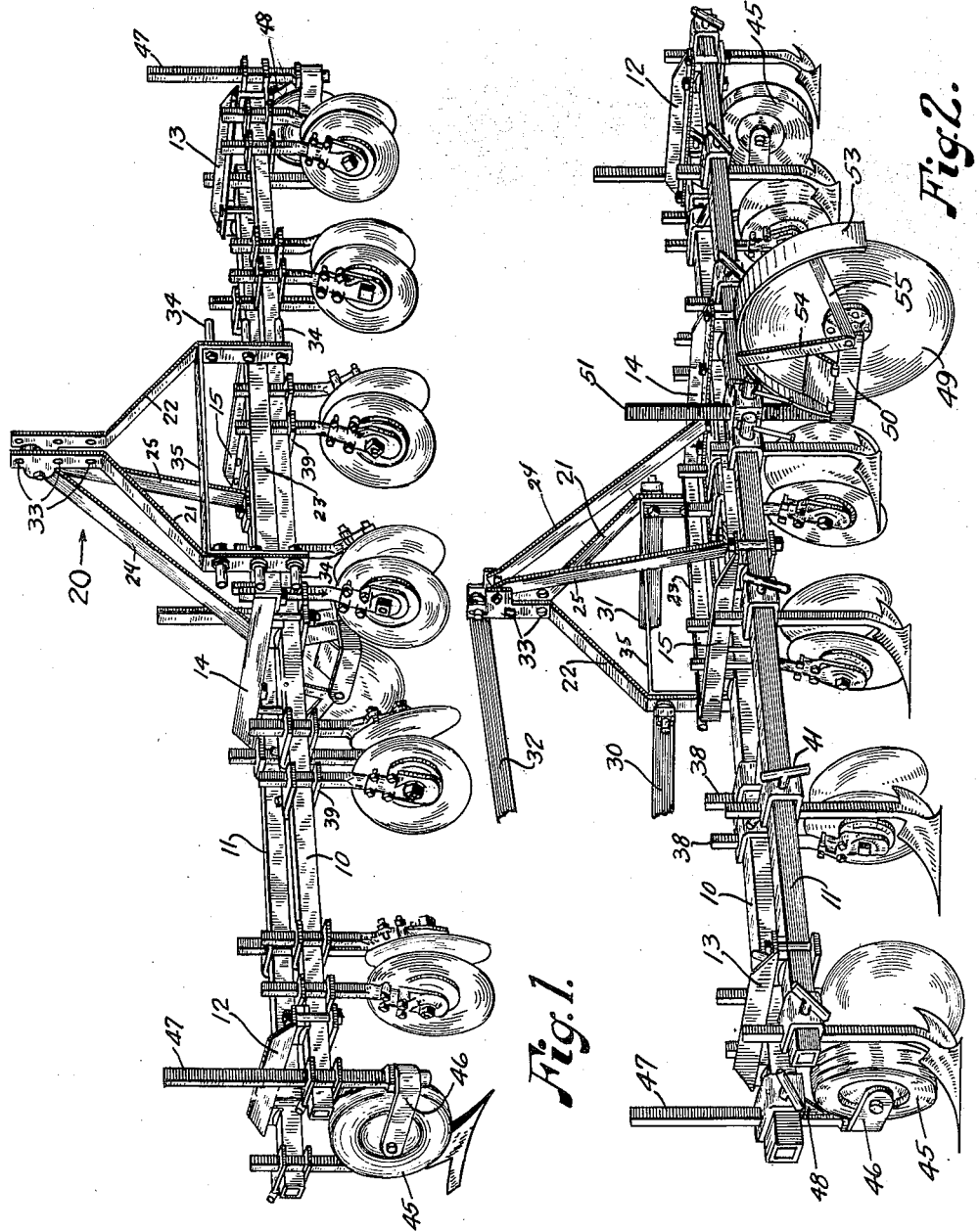
INVENTOR.
Thomas J. Denning
BY
Martin E. Anderson
ATTORNEY

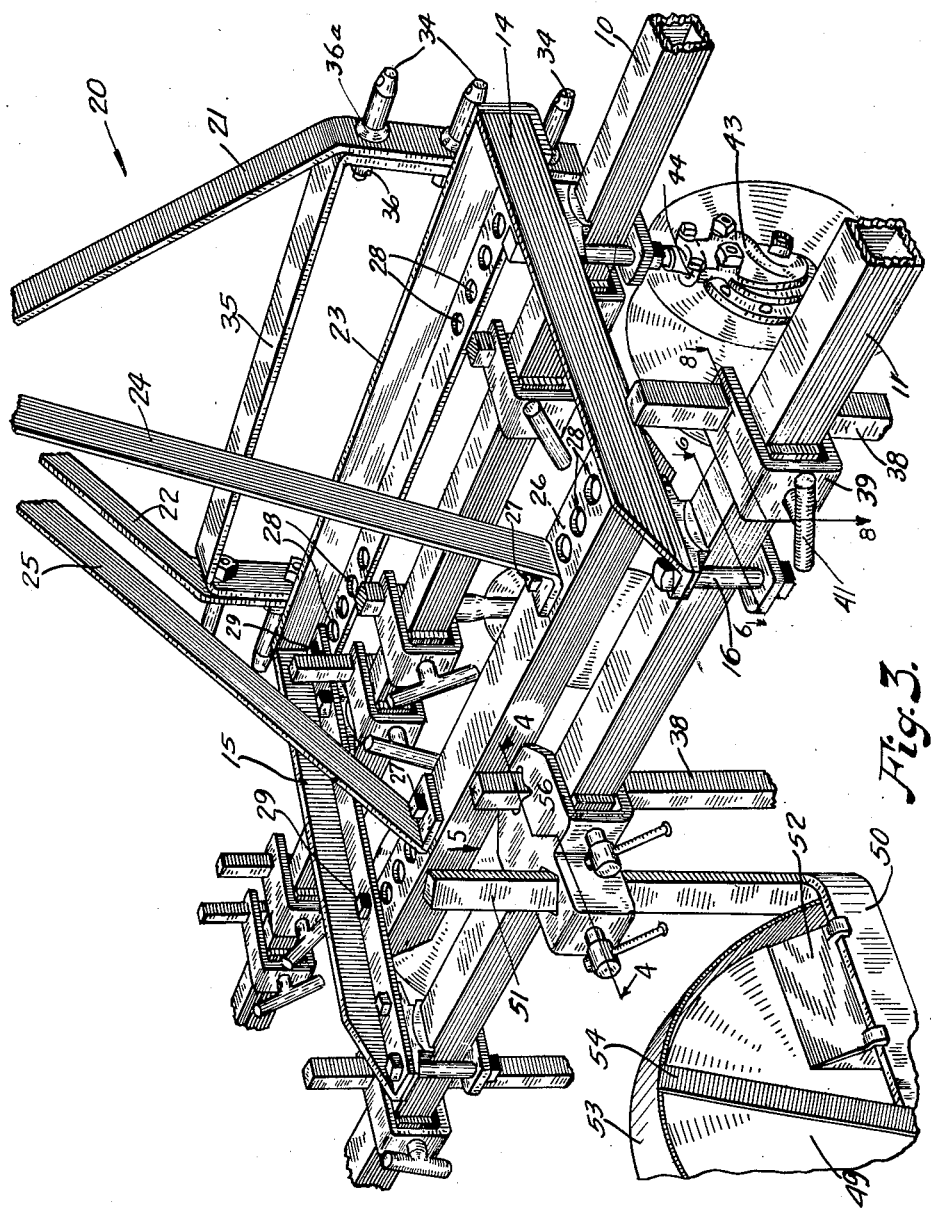

Patented July 31, 1951

2,562,486

UNITED STATES PATENT OFFICE 2,562,486

CULTIVATOR

Thomas J. Denning, Hudson, Colo.

Application December 31, 1948, Serial No. 68,487

7 Claims. (Cl. 97—47)

This invention relates to improvements in cultivators and more particularly to a cultivator for use with tractors equipped with power lift traction links, such as shown by the patent to Ferguson, being No. 2,118,180, granted May 24, 1938.

Cultivators which have been hitherto provided for use with tractors of the type referred to have certain disadvantages among which are the difficulty in making desired adjustments of the tools on the cultivator frame, and achieving optimum traction characteristics under all conditions of adjustment of the tools.

One of the principal objects of this invention is to provide a cultivator in which all necessary adjustments of the various parts thereof, for varying conditions of use, may be accurately and expeditiously made.

Another object is to provide a cultivator in which tools may be disposed in any position along its main frame.

Another object is to provide a cultivator with main frame members which may be adjusted about their longitudinal axes to vary the down pitch of the cultivator sweeps.

Another object is to provide a traction arrangement for the cultivator which permits variation in the height of the cultivator frame above the ground without changing the angularity of the tractor hitch links.

Still further objects, advantages, and salient features will become apparent from a consideration of the description to follow, the appended claims, and the accompanying drawing, in which:

Figure 1 is a front perspective of the cultivator;

Figure 2 is a rear perspective thereof;

Figure 3 is an enlarged rear perspective of the center portion of the cultivator;

Figure 6:
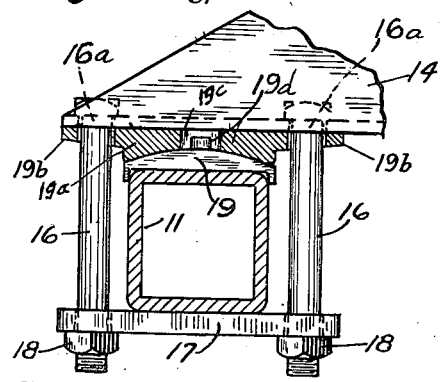
Figure 6 is a vertical section taken on line 6—6 Figure 3, a portion of the section being taken slightly to the left thereof.
Figure 7:
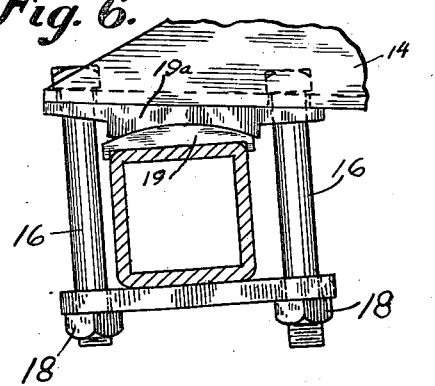
Figure 7 is also a vertical section taken on line 6—6, Figure 3, showing the parts in a different position of adjustment.

Referring in detail to the drawing, and particularly to Figures 1 to 3, the main frame of the cultivator is formed of two square tubular tool frame members 10, 11, secured together in parallel relation by angle iron members 12, 13, disposed near opposite ends of the frame, and by angle iron members 14, 15, adjacent the center thereof. These members are each secured to the frames 10, 11, as best shown in Figure 6, by a pair of bolts 16, 16 in the horizontal flange of the angle member and through similar holes in a strap or bar 17 extending across the lower face of the main frame members, nuts 18 being provided thereon to effect securement. The holes 16a are preferably square to receive the square shank of a carriage bolt so that the bolts will be precluded from turning. An arcuate saddle and saddle plate construction 19, 19a is interposed between each angle iron and frame member so that the frame members may be adjusted to various positions about their longitudinal axes. This is achieved by loosening one of the nuts 18 and tightening the other. The upper part 19a of the saddle is provided with apertured ears 19b which extend laterally and through which the bolts 16 extend, thus preventing the upper part from moving in a horizontal plane relative to member 14. An elongated aperture 19c is also provided in this part which receives a projection 19d on the lower part 19. This latter construction prevents part 19 from becoming dislocated from part 19a when the angle iron member 14 is moved longitudinally of frame 11 when effecting adjustment. The same construction is employed at all of the points of affixation of members 12, 13, 14, and 15 to members 10, 11. Figure 7 illustrates a position of adjustment wherein one of the frames has been angularly adjusted counterclockwise from the position shown in Figure 6. This adjustment varies the down pitch or angle of the tools attached to the frame, for a purpose which will hereinafter appear.

The main frame, just described, is connected to the tractor by a strut assembly 20 and certain other members which will now be described. The strut assembly 20 is formed of an A frame having a pair of vertical members 21, 22, secured at their lower ends to a base member 23 as by welding. Another A frame has a pair of strut members 24, 25 which are bolted at their upper ends to the upper ends of struts 21, 22, and diverge as they extend rearwardly and downwardly, their lower ends being bolted to another base member 26 by bolts 27. Base members 23 and 26 are provided with a plurality of spaced holes 28 adjacent their ends through which bolts extend to secure angle irons 14 and 15 thereto, these angle irons forming connecting frame members between the base members 23, 26 and tool frames 10, 11. This provides a connection between the A frames which permits selectivity of the positions of angle irons 14, 15 along the main frame members 10 and 11, for a purpose which will hereinafter appear.

The A frames are secured to the tractor by a pair of lower hitch links 30, 31, and an upper hitch link 32, which are conventional parts provided on a tractor of the type previously mentioned. The front ends of the lower hitch links 30, 31, are pivoted to the tractor and suitable links (not shown) are provided to raise or lower the rear ends of the hitch links by power derived from the tractor and also position them as desired within their range of movement. The front end of the upper link is also pivoted to the tractor by a rockable link which is spring urged to act as a safety device in event the cultivator tools strike rocks or the like. Since the hitch links and manner of operating same are conventional and form no part of the invention, and are shown in the patent referred to above, illustration of these details is deemed unnecessary.

The upper ends of struts 21, 22, are provided with a plurality of holes 33 through which a pin extends for connecting the upper ends of the A frames to the upper hitch link 32 in various positions of adjustment. A plurality of pins 34 extend laterally from the lower ends of the strut members and lower hitch links 30, 31, may be secured thereto also in various positions of adjustment, for a purpose hereinafter set forth. To add rigidity to the lower end of these struts, a cross member 35 is interposed therebetween, being secured by nuts 36 on the pins 34, the latter being shouldered at 36a as best shown in Figure 3.

Figure 8:
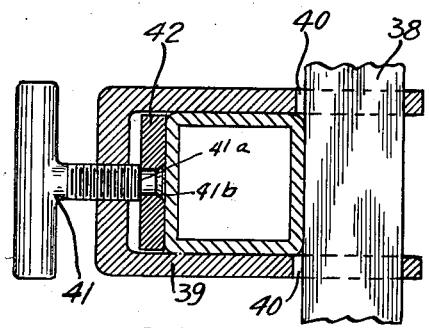
Figure 8 is a vertical section taken through line 8—8, Figure 3.

The square solid tool shanks 38 are each adjustably secured to the frame members 10 or 11 by a U-shaped member 39 having square holes 40 in the legs of the U through which the shank 38 extends. The bight of the U is threaded and receives a tee handle screw 41 which is shouldered at 41a and secured to a pressure plate 42 by riveting the end of the screw 41b into a suitable countersunk hole, as shown in Figure 8, the screw, of course, being free to turn in the pressure plate. When this screw is loosened, the U member may be moved to a desired position on the frame and the shank 38 may also be moved vertically to a desired position. Tightening of this screw effects securement of both of the adjustments described.

The lower ends of certain of these shanks are provided with integral sweeps, also sometimes called duck feet, points, or shovels. Others are provided with harrow disks. As best shown in Figure 3, these harrow disks may be adjusted about the axis of the shanks. The lower ends of the square shanks have a circular portion upon which is mounted a member 43 which is clamped to the circular portion by a U bolt 44. Member 43 carries any type of harrow disk. The lower ends of the shanks may, of course, carry various tools other than the ones shown and described, or in different arrangements, combinations, or spacings along the frame members, depending upon the particular operation to be performed, which may be crop cultivating, field cultivating, or other ground conditioning.

The ends of the main frame are provided with support wheels 45 which are rotatably mounted on brackets 46, the latter each being free to swivel on the end of a shank 47 which is secured to the frame by an adjustable connection similar to U member 39. The shank is vertically adjustable relative to the main frame in the same manner as the tools previously described. To add rigidity to the shanks a gusset plate 48 is welded to the U clamp member, its vertical edge abutting the shank in sliding relation therewith. When the wheel strikes certain obstructions or surface contours, there is a tendency to move the lower ends of the shanks rearwardly, the gusset plates resisting this tendency.

For the purpose of preventing side sway of the cultivator, adding stability thereto, and making it accurately follow the direction of the tractor, a rolling fin 49 is attached to the rear frame member 11. This fin is a metal disk rotatably mounted in a U-shaped bracket 50, the bight of the U being suitably secured, as by welding, to a shank 51, similar to tool shanks 38. To each leg of the bracket a scraper 52 is secured, these scrapers serving to remove any surplus material which clings to the faces of the fin. A guard 53 covers the upper portion of the fin to protect persons who might otherwise be injured by contact therewith. This guard is welded to the bracket adjacent the bight and braced by straps 54, 55, the ends of which are secured to the guard and legs of the U bracket.

Figure 4:
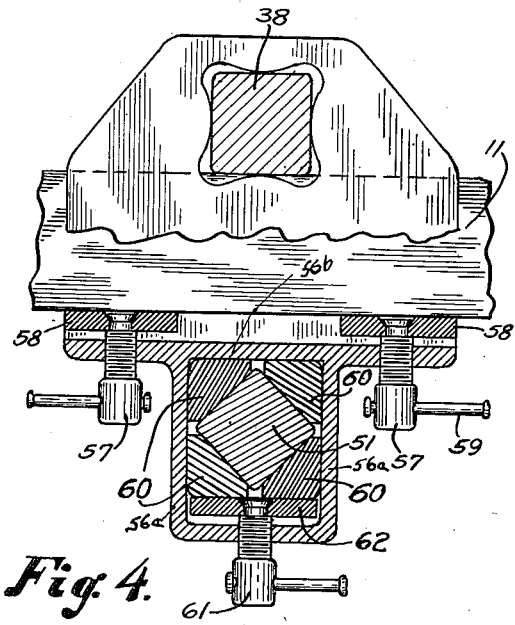
Figure 4 is an enlarged horizontal section taken on line 4—4, Figure 3.
Figure 5:
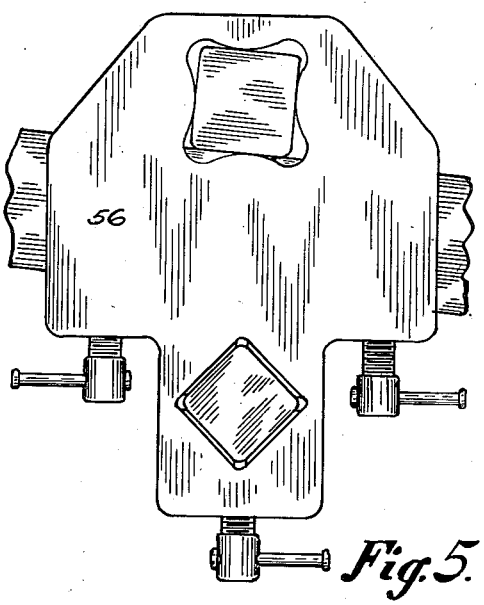
Figure 5 is a plan view looking in the direction of arrow 5, Figure 3, showing an adjusted position of the structure shown in Figure 4.

An adjustment for the position of the fin relative to the frame is also provided. This consists of a clamp member 56, as best shown in Figures 3, 4, and 5, which is secured to frame 11 in a manner similar to that described for the tool shanks. A pair of screw members 57 and pressure plates 58 are provided, rather than a single screw as previously described. These screws are disposed laterally of shank 38 and the entire clamp member 56 may be rotated about a vertical axis by loosening one of the screws 57 and tightening the other. Figure 5 shows a position wherein the clamp member 56 has been rotated relative to the frame. Screws 57 are provided with slidable handles 59 so that they may be operated without the use of any tools such as a wrench. The slidable handles provide an expedient means to obtain sufficient leverage on the screws and yet permit the screw heads to be turned in the close quarters on the clamp member 56.

The rear portion of the clamp member is hollow and carries four triangular blocks 60 as shown in Figure 4. A screw 61 and pressure plate 62, forces one pair of the blocks toward the other pair, the shank 51 being interposed therebetween. To install these blocks, they are inserted through the square hole of the bracket member and moved to the position shown in Figure 4. When in this position, the upper and lower walls of the clamp member prevent vertical movement of the blocks, and the walls 56a, 56b, and shank 51 prevent lateral movement thus securing the blocks within the hollow rear portion of clamp member 56.

In operation of the device, tools are applied to the frame members, the type of tools, their spacing, and number, being chosen according to the particular type of ground engaging operation desired. The distance which the tools will operate below the ground surface is determined by the distance they project beyond the lower surfaces of the support wheels 45. The distance which the tools project below the frame will depend upon the particular operation. If it be cultivation of beans, beets, peas, or other crop which grows only a relatively short distance above the ground, the tools will project a relatively short distance below the frame. If it be corn or other crop, however, which grows a higher distance above the ground, the tools will project further from the frame to clear the top of the crop as it passes over it. After the desired projection of the tools has been determined and the tools set accordingly, the wheels will then be adjusted to obtain the desired depth of cut of the tools. The hitch links are then connected to one of the three sets of pins 34 and holes 33, the set chosen being such that the hitch links will be disposed in a slightly downwardly inclined position, that is, with the rear ends of the links slightly lower than the front ends where they are pivoted to the tractor. The proper choice of one of the three sets will usually place the links at an angle which is at or near optimum; however, if a more accurate adjustment is desired, the tools and wheels may be adjusted so that the frame will be slightly higher or lower which, in effect, will provide any adjustment intermediate the sets. The spaced holes and pins may also be increased in number, if desired, to provide a more critical selection of the hitch link angle and, if desired, slots may be provided for the shouldered pins 34 so that they are universally adjustable within the range of adjustment. As will be apparent, a similar connection may also be provided at the top of the A frame to receive the top hitch link.

Farming implements of the particular type disclosed have not hitherto been provided with the adjustment described. The projection of the tools could, of course, be chosen for a low or high crop, which thus positioned the frame of the implement low or high above the ground as in this invention. These prior devices, however, had only one position on the A frame to which the hitch links could be attached. This necessarily varied the hitch link angle depending upon the height of the frame above the ground. The present invention is to be distinguished from these devices since it provides for maintaining the hitch links at an optimum angle regardless of the height of the implement frame above the ground.

The importance of the link angle just referred to will now be set forth. The down pitch of the sweeps not only changes the nature of the furrow, but also changes the forces applied to the hitch links and to the tractor and tractor wheels. It will be observed that the lower hitch links are attached to the frame considerably above the ground. When the sweeps dig into the ground, there is a tendency for the frame to rotate in a direction such that the top of the A frame moves toward the tractor. This, therefore, applies a force to the top hitch link which tends to force the front wheels of the tractor into the ground. The tendency of the sweeps to dig in also exerts a downward force on the lower hitch links which tends to force the rear wheels of the tractor into the ground. The amount and distribution of the forces on the front and rear wheels depends on the hitch link angle and hence if this angle cannot be chosen at an optimum for all heights of the implement frame above the ground, the versatility of the equipment is, of course, impaired. One of the principal purposes of applying the forces to the wheels of the tractor is to obtain increased traction of the tractor, which effects greater traction ability with a light weight tractor. The magnitude of the forces must be accurately applied to the wheels under all conditions of implement adjustment so that steering of the tractor is not impaired as, for example, by excessive pressure on the front wheels. The forces above mentioned may be determined, as desired, by the depth of cut and also the down pitch angle of the sweeps. This downpitch angle is changed by rotating the frames 10, 11 about their longitudinal axes with nuts 18.

As previously mentioned, the rolling fin adds stability to the cultivator so that it follows the tractor without sway. This sway is caused by the unevenness of the ground and the looseness of the linkage between the tractor and cultivator. To eliminate this sway the rolling fin which enters the ground to the rear of the sweep which is disposed immediately ahead of it, must be accurately adjusted relative to the frame. The clamp member 56, as previously described, may be rotated relative to the frame, thus changing the relative position of the rolling fin to the frame. The screws 57 provide a delicate and accurate adjustment for the fin position, since one screw 57 may be loosened slightly and the other screw tightened a like amount.

By placing the rolling fin behind the rear frame, it also has a much greater leverage on the main frame than if it were placed at the front of the frame near the traction links as has been customary in the prior art. Heretofore, it was not possible to dispose the fin in alignment with a tool while the sweep and tool were attached to the same frame member. Since the bracket 56 of this invention serves to secure both a tool and the fin to the main frame at the same position with the tool and fin in alignment, this objection has been obviated.

In cultivators of the type described as heretofore provided, the A frame has been connected to the main frame in such manner that the entire length of the main frame members could not be utilized for tools. Thus, if members 14, 15 were secured to the main frame in a fixed position, it would not be possible to place a tool at the point of affixation. This, of course, limits the versatility of the cultivator since a particular operation may call for placing tools at these points of affixation. With the present invention the point of affixation of members 14, 15 may be varied because of the provision of the plurality of holes 28. If, for example, it were desired to place a tool at the point of affixation as the parts are connected in Figure 3, the members 14, 15 would be moved toward each other to another set of holes. Since a desired tool spacing will seldom, if ever, be closer than the width of one of the U tool clamps, this renders the entire length of frame members 10, 11 available for placing tools thereon.

Having described the invention, what is claimed as new is:

1. A farming implement having a main frame comprising a pair of elongated substantially parallel spaced rigid bars disposed in a substantially horizontal plane and adapted to be moved over the ground in a direction substantially perpendicular to the longitudinal axes of the bars, the bars being continuous and of uniform cross-section throughout their lengths and adapted to carry a plurality of downwardly extending ground engaging tools longitudinally adjustable therealong, an auxiliary frame for moving the bars in the direction aforesaid, comprising; an upwardly ranging strut assembly disposed between the ends of the main frame having means near its lower end adapted to connect it to a spaced lower pair of hitch links on a tractor, and having means near its upper end adapted to connect it to an upper hitch link on a tractor, a pair of elongated base members disposed in substantially parallel relation to the bars to which the strut assembly is rigidly connected, a pair of spaced connecting frame members extending transversely of the bars, means for adjustably connecting the connecting frame members to the base members at various points longitudinally of the latter, and means for adjustably connecting the connecting frame members to the bars at various points along the lengths of the latter, adjustment of the last named means axially of the bars permitting a ground engaging tool to occupy the position on a bar formerly occupied by the last named means, whereby a ground engaging tool may be disposed at any desired position on a bar between the ends of the auxiliary frame.

2. A farming implement in accordance with claim 1 including means on the strut assembly for connecting it to the lower and upper hitch links at various vertical positions on the strut assembly.

3. A farming implement in accordance with claim 1 wherein said last named means provides a connection to permit individual angular adjustment of the bar about their longitudinal axes.

4. A farming implement in accordance with claim 1 including a rotatable circular ground engaging fin secured to the rearmost bar and trailing behind same adapted to stabilize the direction of movement of the implement.

5. An auxiliary frame for use in moving a pair of spaced parallel farming implement carrying bars, disposed one behind the other, over the ground perpendicular to their longitudinal axes and behind a lower pair of spaced hitch links and one upper hitch link disposed in a vertical plane between the vertical planes passing through the lower hitch links, said auxiliary frame comprising; a pair of elongated spaced base members adapted to be disposed in parallel relation to said bars, a pair of spaced connecting frame members extending transversely of the base members, means for adjustably connecting the connecting frame members to the base members at various points longitudinally of the latter, means for adjustably connecting the connecting frame members to the bars at various points along the lengths of the latter, and an upwardly ranging frame immovably connected to said base members having a lower portion having connecting means thereon adapted to be connected to the lower hitch links and an upper portion above the base members having connecting means thereon adapted to be connected to the upper hitch link.

6. An auxiliary frame in accordance with claim 5 wherein said base members are spaced apart a distance such that the forward base member may be disposed ahead of the forward bar and the rearward base member may be disposed between the bars.

7. An auxiliary frame in accordance with claim 5 including means on the upwardly ranging frame for connecting the three hitch links thereto at various vertical elevations, whereby the angle between a plane passing through the bars and a plane passing through the lower hitch links may be varied.

THOMAS J. DENNING.

REFERENCES CITED

The following references are of record in the file of this patent:

UNITED STATES PATENTS

| Number | Name | Date |
| --- | --- | --- |
| 277,258 | Fowler | May 8, 1883 |
| 323,442 | Packer | Aug. 4, 1885 |
| 893,311 | Davis | July 14, 1908 |
| 1,001,522 | Hamilton | Aug. 22, 1911 |
| 1,830,013 | Bohmker | Nov. 3, 1931 |
| 1,852,212 | Murphy | Apr. 5, 1932 |
| 1,975,271 | Hansmann | Oct. 2, 1934 |
| 2,145,007 | Foster | Jan. 24, 1939 |
| 2,195,516 | Ferguson | Apr. 2, 1940 |
| 2,330,283 | Hipple | Sept. 28, 1943 |
| 2,333,586 | Rude | Nov. 2, 1943 |
| 2,352,963 | McMahon | July 4, 1944 |
| 2,430,434 | Rutter | Nov. 4, 1947 |
| 2,465,641 | Gardner | Mar. 29, 1949 |

FOREIGN PATENTS

| Number | Country | Date |
| --- | --- | --- |
| 2,864 of 1915 | Great Britain | Dec. 16, 1915 |
| 549,114 | Great Britain | Nov. 6, 1942 |